H. O., W. L. & E. A. EKERN.
DRIVE SHAFT TUBE SUPPORT.
APPLICATION FILED APR. 3, 1917.
1,254,488.
Patented Jan. 22, 1918.
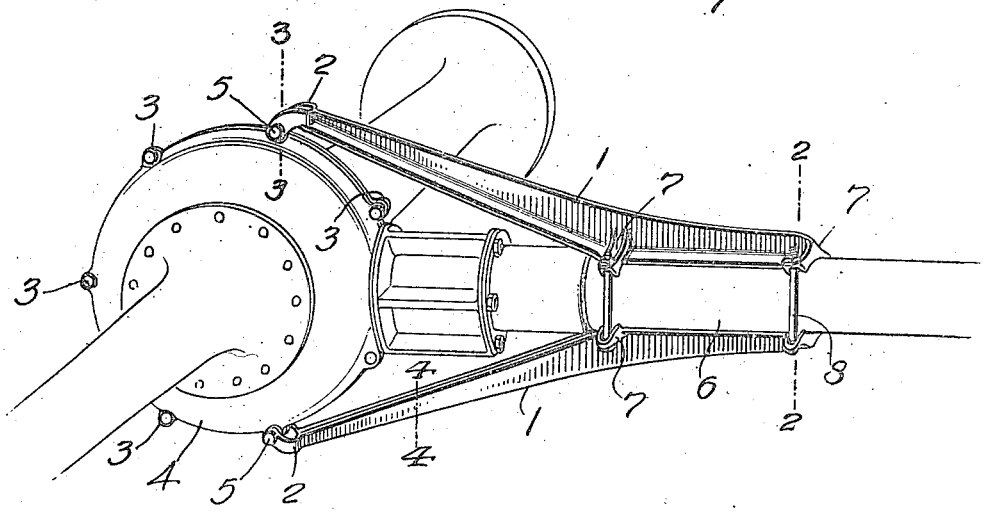
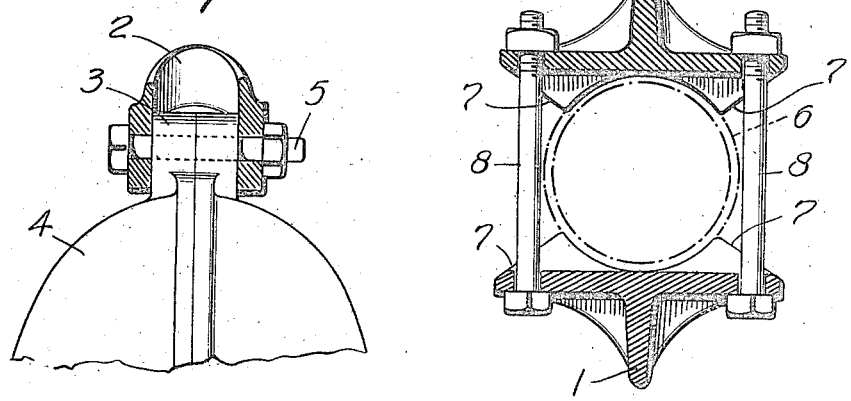
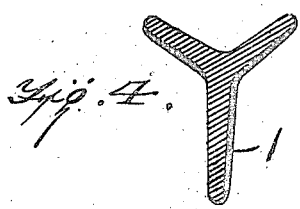
WITNESSES
INVENTORS
H. O. EKERN,
W. L. EKERN,
E. A. EKERN,
BY
ATTORNEYS

UNITED STATES PATENT OFFICE.

HELMER O. EKERN, WILLIE L. EKERN, AND EMIL A. EKERN, OF FLANDREAU, SOUTH DAKOTA.

DRIVE-SHAFT-TUBE SUPPORT.

1,254,488.   Specification of Letters Patent.   Patented Jan. 22, 1918.

Application filed April 3, 1917. Serial No. 159,435.

*To all whom it may concern:*

Be it known that we, HELMER O. EKERN, WILLIE L. EKERN, and EMIL A. EKERN, citizens of the United States, and residents of Flandreau, in the county of Moody and State of South Dakota, have invented certain new and useful Improvements in Drive-Shaft-Tube Supports, of which the following is a specification.

Our invention relates to improvements in supports for the drive shaft tubes of automobiles, and it consists in the combinations, constructions and arrangements herein described and claimed.

The vibration which is occasioned by the travel of an automobile over roads, especially if the latter are rough, will often cause the tube or housing of a final drive shaft of an automobile to crystallize, and in due time to break. This tends not only to cause considerable noise by the rattling of the tube on the shaft, but it usually damages the drive gears and bearings.

An object of our invention is to provide a drive shaft tube support which is light in weight, can be easily attached, and which will eliminate the vibration which causes the tube to break.

A further object of our invention is to provide a support which is so constructed that it may be quickly applied to the final drive shafts, housings or tubes, such as that, for instance, of the Ford car, without necessitating any change in the housing or tube, or in the differential casing to which the tube is attached.

Other objects and advantages will appear in the following specification, and the novel features of the invention will be particularly pointed out in the appended claim.

Our invention is illustrated in the accompanying drawings, forming a part of the application, in which:

Figure 1 is a perspective view showing one embodiment of our invention,

Fig. 2 is a section on the line 2—2 of Fig. 1,

Fig. 3 is a section along the line 3—3 of Fig. 1, and

Fig. 4 is a section on the line 4—4 of Fig. 1.

In carrying out our invention we provide two brace members, these brace members being alike and a description of one sufficing for both. Each brace member consists of a unitary body portion 1 of malleable iron and of the shape shown in the drawings. The arm is substantially Y-shape in cross section, as will be seen from Fig. 2, being slightly curved, however, in the manner shown clearly in Fig. 4. At one end of the arm is a fork 2 which is arranged to straddle the lugs 3 of the differential housing 4. Bolts 5 are arranged to pass through alined openings in the fork and the lugs, so as to bind the parts firmly together, these bolts 5 being of the same size as the bolts which hold the parts of the casing together, but being longer.

The opposite end of the support is formed to fit the final drive housing or tube 6. Laterally extending integral ears 7 are provided having openings through which bolts 8 are passed, these bolts being provided with nuts for holding the two members of the support firmly together. As will be seen from Fig. 2, the ears themselves are rounded to conform to the contour of the tube 6.

One of these members is disposed above the tube or housing 6 and the other is disposed below it. The construction affords a rigid support for the rear end of the tube 6 near the point where it is joined with the differential housing 4; it is at this point where the breakage usually takes place.

A device of this kind will insure against breakage of the tube 6. It prevents the vibration which causes the latter to crystallize and finally give way. The parts which form the support are simple in construction, light in weight, and can be easily shipped.

We claim:

In a motor vehicle, the combination with a differential housing and a drive shaft housing, the two housings being connected by an outwardly extending joint, of two like stay members the one placed above and the other below the housings in vertical line throughout their extent, the forward portions of the stay members being in contact with the drive shaft housing and having front and rear opposed lateral extensions, the rear portions of the stay members inclining and terminating in forks to receive lugs of the differential housing, bolts connecting the forks and lugs of the differential housing, and other bolts connecting corresponding lateral extensions of the stay members and clamping the latter to the drive shaft housing.

HELMER O. EKERN.
WILLIE L. EKERN.
EMIL A. EKERN.

Copies of this patent may be obtained for five cents each, by addressing the "Commissioner of Patents Washington, D. C."